US012611800B2

(12) United States Patent
Donners et al.

(10) Patent No.: US 12,611,800 B2
(45) Date of Patent: Apr. 28, 2026

(54) GLASS FIBER REINFORCED THERMOPLASTIC POLYMER COMPOSITION COMPRISING A THERMOPLASTIC POLYMER COMPOSITION WITH HIGH FLOWABILITY

(71) Applicant: SABIC Global Technologies B.V., Bergen op Zoom (NL)

(72) Inventors: Rob Donners, Brunssum (NL); Zahra Fahimi, Maastricht (NL); Tariq Syed, Novi, MI (US); Bin Sun, Commerce Township, MI (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 161 days.

(21) Appl. No.: 18/269,910

(22) PCT Filed: Dec. 21, 2021

(86) PCT No.: PCT/EP2021/087110
§ 371 (c)(1),
(2) Date: Jun. 27, 2023

(87) PCT Pub. No.: WO2022/144250
PCT Pub. Date: Jul. 7, 2022

(65) Prior Publication Data
US 2024/0316826 A1     Sep. 26, 2024

(30) Foreign Application Priority Data

Dec. 28, 2020     (EP) ..................................... 20217421

(51) Int. Cl.
| | |
|---|---|
| *B29B 9/06* | (2006.01) |
| *B29K 23/00* | (2006.01) |
| *B29K 105/00* | (2006.01) |
| *B29K 105/08* | (2006.01) |
| *B29K 105/16* | (2006.01) |
| *B29K 309/08* | (2006.01) |
| *B29L 31/30* | (2006.01) |

(52) U.S. Cl.
CPC .......... *B29B 9/065* (2013.01); *B29K 2023/12* (2013.01); *B29K 2023/14* (2013.01); *B29K 2105/0094* (2013.01); *B29K 2105/0872* (2013.01); *B29K 2105/16* (2013.01); *B29K 2309/08* (2013.01); *B29L 2031/30* (2013.01)

(58) Field of Classification Search
CPC .................................................... B29B 9/065
See application file for complete search history.

(56) References Cited

U.S. PATENT DOCUMENTS

| | | | |
|---|---|---|---|
| 4,338,233 A | 7/1982 | Das et al. | |
| 4,399,054 A | 8/1983 | Ferraris et al. | |
| 4,472,524 A | 9/1984 | Albizzati | |
| 5,017,714 A | 5/1991 | Welborn, Jr. | |
| 5,324,820 A | 6/1994 | Baxter | |
| 9,738,015 B2 * | 8/2017 | Biemond | B29C 45/0005 |
| 10,435,524 B2 * | 10/2019 | Tufano | B29B 9/06 |
| 10,435,540 B2 * | 10/2019 | Steenbakkers-Menting | C08J 5/10 |
| 10,486,335 B2 * | 11/2019 | Tufano | B29B 9/06 |
| 10,688,760 B2 * | 6/2020 | Solenicki | B32B 27/286 |
| 10,828,802 B2 * | 11/2020 | Biemond | B29B 9/14 |
| 11,273,585 B2 * | 3/2022 | Yanev | B29C 45/0005 |
| 11,273,884 B2 * | 3/2022 | Guo | B29B 9/06 |
| 11,608,432 B2 * | 3/2023 | Lecouvet | C03C 25/30 |
| 2017/0218154 A1 * | 8/2017 | Huang | C08J 9/232 |
| 2018/0208725 A1 * | 7/2018 | Lakeman | C08J 5/10 |
| 2020/0078988 A1 * | 3/2020 | Tufano | B29B 9/14 |
| 2020/0216624 A1 * | 7/2020 | Hamilton | B29C 45/0013 |
| 2022/0033608 A1 * | 2/2022 | Auger | C08J 9/32 |
| 2022/0193956 A1 * | 6/2022 | Huang | B29C 48/25686 |
| 2024/0042344 A1 * | 2/2024 | Zhou | B01D 3/38 |
| 2024/0301250 A1 * | 9/2024 | Guo | B29C 48/832 |
| 2024/0316826 A1 * | 9/2024 | Donners | B29B 15/122 |
| 2025/0034379 A1 * | 1/2025 | Park | C08L 23/12 |
| 2025/0066563 A1 * | 2/2025 | Syed | C08K 5/544 |

FOREIGN PATENT DOCUMENTS

| | | |
|---|---|---|
| EP | 0206189 A1 | 12/1986 |
| EP | 0397505 B1 | 12/1994 |
| EP | 1460166 A1 | 9/2004 |
| EP | 0994978 B1 | 10/2004 |
| EP | 0921919 B1 | 7/2005 |
| NO | 2020229411 A1 | 11/2020 |
| WO | 9900543 A1 | 1/1999 |

(Continued)

OTHER PUBLICATIONS

International Search Report for International Application No. PCT/EP2021/087110; International Filing Date Dec. 21, 2021; Date of Mailing Mar. 16, 2022; 4 pages.

(Continued)

*Primary Examiner* — Nicholas Krasnow

(74) *Attorney, Agent, or Firm* — CANTOR COLBURN LLP

(57) ABSTRACT

The present invention relates to a process for producing a glass fiber reinforced thermoplastic polymer composition and such glass fiber reinforced thermoplastic polymer composition. The present invention further relates to an article comprising the glass fiber reinforced thermoplastic polymer composition. The glass fiber reinforced thermoplastic polymer composition has improved white spot performance.

16 Claims, No Drawings

(56)        References Cited

FOREIGN PATENT DOCUMENTS

| WO | 2006010414 A1 | 2/2006 |
| WO | 2009080281 A1 | 7/2009 |
| WO | 2014053590 A1 | 4/2014 |
| WO | 2020229410 A1 | 11/2020 |

OTHER PUBLICATIONS

Ser van der Ven, "Polypropylene and other Polyolefins: Polymerization and Characterization," Studies in Polymer Science 7, Elsevier (1990), pp. 1-11.
Written Opinion for International Application No. PCT/EP2021/087110; International Filing Date Dec. 21, 2021; Date of Mailing Mar. 16, 2022; 5 pages.

* cited by examiner

GLASS FIBER REINFORCED THERMOPLASTIC POLYMER COMPOSITION COMPRISING A THERMOPLASTIC POLYMER COMPOSITION WITH HIGH FLOWABILITY

CROSS-REFERENCE TO RELATED APPLICATIONS

This application is a National Stage application of PCT/EP2021/087110, filed Dec. 21, 2021, which claims the benefit of European Application No. 20217421.5, filed Dec. 28, 2020, both of which are incorporated by reference in their entireties herein.

The present invention relates to a process for producing a glass fiber reinforced thermoplastic polymer composition and such glass fiber reinforced thermoplastic polymer composition. The present invention further relates to an article comprising the glass fiber reinforced thermoplastic polymer composition.

A glass fiber reinforced thermoplastic polymer composition can be made by a process comprising subsequent steps of unwinding from a package of a continuous glass multifilament strand and applying a sheath of polypropylene around said multifilament strand to form a sheathed continuous multifilament strand.

Such process is known from International application WO 2009/080281. This published patent application discloses a process for producing a long glass fiber-reinforced thermoplastic polymer composition, which comprises the subsequent steps of i) unwinding from a package of at least one continuous glass multifilament strand, ii) applying an impregnating agent to said at least one continuous glass multifilament strand to form an impregnated continuous multifilament strand, and iii) applying a sheath of thermoplastic polymer around the impregnated continuous multifilament strand to form a sheathed continuous multifilament strand.

WO2020229411 discloses a process for the preparation of long glass fiber reinforced composition using glass multifilaments with various thickness to achieve a balance between free glass, glass fiber distribution and mechanical properties.

WO2020229410 discloses a process for the preparation of a tape reinforced by continuous glass fibers.

It is desirable that a moulded article made from a glass fiber-reinforced thermoplastic polymer composition has a good visual appearance such as a surface with less white spots. White spots may occur due to an insufficient dispersion of the fibers in the article.

It is an objective of the present invention to provide a glass fiber reinforced thermoplastic polymer composition in which the above-mentioned and/or other needs are met.

Accordingly, the invention provides a process for the preparation of a glass fiber reinforced thermoplastic polymer composition (G) comprising comprising the subsequent steps of a) unwinding from a package of at least one continuous glass multifilament strand;

b) applying the impregnating agent to the continuous glass multifilament strands to form the impregnated continuous multifilament strands c) applying a sheath of thermoplastic polymer composition (X) around said multifilament strand to form a sheathed continuous multifilament strand, wherein the melt flow index (MFI) of the thermoplastic polymer composition (X) is in the range from 78 to 180 dg/min as measured according to ISO1133-1:2011 with a 2.16 kg load at 230° C.

It was surprisingly found that a moulded article made from the glass fiber reinforced thermoplastic polymer composition (G) obtained in the process according to the invention has a good visual appearance in which white spots are reduced. Although not wishing to be bound by any theory, it is thought that the high flowability of the thermoplastic polymer composition (X) improves the dispersion of the multifilament strands in the article, which prevents the formation of white spots.

The process according to the invention is typically known as a wire-coating process. Wire-coating is usually done by passing the continuous glass multifibre strand (roving) through a wire-coating die. Said die is attached to an extruder which supplies molten thermoplastic polymer through an opening substantially perpendicular to the direction of the glass multifibre strand through the die. As such the thermoplastic polymer basically sheaths or encapsulates the glass multifibre strand which is the "wire" to be "coated". Such a process is also disclosed in WO 99/00543, the essential difference being that WO 99/00543 does not require the application of impregnating agent prior to the sheathing with the thermoplastic polymer and does not limit the flowability of the thermoplastic polymer.

WO2009/080281A1 discloses a process comprising the steps of a) unwinding from a package of at least one continuous glass multifilament strand;

b) applying the impregnating agent to the continuous glass multifilament strands to form the impregnated continuous multifilament strands c) applying a sheath of thermoplastic polymer around said multifilament strand to form a sheathed continuous multifilament strand.

However WO2009/080281A1 does not disclose any advantage of the high flowability of the thermoplastic polymer.

Both WO 99/00543 and WO2009/080281A1 are hereby incorporated by reference.

The process for the production of the glass fiber-reinforced thermoplastic polymer composition (G) according to the invention may further comprise the following subsequent steps after step c) to obtain the glass fiber reinforced polymer composition (G) in pellet form.

d) cooling the sheathed continuous glass multifilament;

e) cutting the sheathed continuous glass multifilament strand into pellets.

Preferably the step d) is performed in water bath.

In step e) the pellets may typically be cut with a length of from 2 to 50 mm, preferably from 5 to 30 mm, more preferably from 6 to 20 and most preferably from 10 to 16 mm. The length of the glass fibers is typically substantially the same as the length of the pellet.

The total amount of the thermoplastic polymer composition (X) and the impregnated continuous multifilament strand in the pellet is preferably at least 95 wt %, at least 98 wt %, at least 99 wt %, at least 99.9 wt % or 100 wt % with respect to the pellet.

Preferably the process according to the invention runs at a line speed of at least 100 m/min, at least 150 m/min, at most 1000 m/min. The basic line speed is to have a higher production rate, too high line speed may lead to product with poor quality.

Step e) may be followed by a step of moulding the pellets into (semi-) finished articles. Preferred moulding processes is injection moulding. The article is preferably an antomotive part, such as automotive exterior parts like bumpers, automotive interior parts like instrument panels, or automotive parts under the bonnet.

The invention also relates to the use of the glass fiber reinforced thermoplastic polymer composition (G) obtained in the process according to the invention in automotive application.

The invention also relates to an automotive part comprising or made from the glass fiber-reinforced thermoplastic polymer composition (G) obtained in the process according to the invention.

Thermoplastic Polymer Composition (X)

A thermoplastic polymer composition (X) is used in step c) of the process according to the invention. It is essential for the present invention that the melt flow index (MFI) of the thermoplastic polymer composition is in the range from 78 to 180 dg/min to have reduced white spot on the surface, preferably in the range from 78 to 148 dg/min, preferably in the range from 95 to 122 dg/min, more preferably in the range from 96 to 119 dg/min, even more preferably in the range from 103 to 118 dg/min as measured according to ISO1133-1:2011 with a 2.16 kg load at 230° C.

Thermopolastic Polymer in Thermoplastic Polymer Composition (X)

The thermoplastic polymer composition preferably comprises a thermoplastic polymer. Suitable examples of thermoplastic polymers include but are not limited to polyamide, such as polyamide 6, polyamide, 66 or polyamide 46; polyolefins, for example polypropylenes and polyethylenes; polyesters, such as polyethylene terephthalate, polybutylene terephthalate; polycarbonates; polyphenylene sulphide; polyurethanes and and mixtures thereof.

Preferably the amount of the thermoplastic polymer is in the range from 65.1 to 99.5 wt %, preferably in the range from 85.3 to 99.2 wt %, even more preferably in the range from 93.2 to 99.0 wt % based on the total amount of the thermoplastic polymer composition (X). In a special embodiment, the thermoplastic polymer composition consists of the thermoplastic polymer.

In another embodiment, the thermoplastic polymer composition comprises at least 60 wt %, for example at least 70 wt %, for example at least 75 wt % and/or at most 99 wt %, for example at most 95 wt %, for example at most 90 wt % of the thermoplastic polymer.

The thermopolastic polymer is preferably a polypropylene, for example a propylene homopolymer or a random propylene copolymer or a heterophasic propylene copolymer.

More preferably the thermoplastic polymer is a propylene homopolymer.

Preferably the polypropylene has an MFI in the range of 78 to 180 dg/min, preferably in the range from 78 to 148 dg/min, preferably in the range from 95 to 122 dg/min, more preferably in the range from 96 to 119 dg/min, even more preferably in the range from 103 to 118 dg/min as measured according to ISO1133-1:2011 with a 2.16 kg load at 230° C.

A propylene homopolymer can be obtained by polymerizing propylene under suitable polymerization conditions. A propylene copolymer can be obtained by copolymerizing propylene and one or more other α-olefins, preferably ethylene, under suitable polymerization conditions. The preparation of propylene homopolymers and copolymers is, for example, described in Moore, E. P. (1996) Polypropylene Handbook. Polymerization, Characterization, Properties, Processing, Applications, Hanser Publishers: New York.

The random propylene copolymer may comprise as the comonomer ethylene or an α-olefin chosen from the group of α-olefins having 4 to 10 C-atoms, preferably ethylene, 1-butene, 1-hexene or any mixtures thereof. The amount of the comonomer is preferably at most 10 wt % based on the random propylene copolymer, for example in the range from 2-7 wt % based on the random propylene copolymer.

Polypropylenes can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems. All are, in themselves, known in the art.

Heterophasic propylene copolymers are generally prepared in one or more reactors, by polymerization of propylene in the presence of a catalyst and subsequent polymerization of an ethylene-α-olefin mixture. The resulting polymeric materials are heterophasic, but the specific morphology usually depends on the preparation method and monomer ratios used.

The heterophasic propylene copolymers can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; Polypropylene and other Polyolefins, by Ser van der Ven, Studies in Polymer Science 7, Elsevier 1990; WO06/010414, U.S. Pat. Nos. 4,399,054 and 4,472,524.

Preferably, the heterophasic propylene copolymer is made using Ziegler-Natta catalyst.

The heterophasic propylene copolymer may be prepared by a process comprising polymerizing propylene and optionally ethylene and/or α-olefin in the presence of a catalyst system to obtain the propylene-based matrix and subsequently polymerizing ethylene and α-olefin in the propylene-based matrix in the presence of a catalyst system to obtain the dispersed ethylene-α olefin copolymer. These steps are preferably performed in different reactors. The catalyst systems for the first step and for the second step may be different or same.

The heterophasic propylene copolymer of the composition of the invention consists of a propylene-based matrix and a dispersed ethylene-α-olefin copolymer. The propylene-based matrix typically forms the continuous phase in the heterophasic propylene copolymer. The amounts of the propylene-based matrix and the dispersed ethylene-α-olefin copolymer may be determined by $^{13}$C-NMR, as well known in the art.

The propylene-based matrix consists of a propylene homopolymer and/or a propylene copolymer consisting of at least 70 wt % of propylene monomer units and at most 30 wt % of comonomer units selected from ethylene monomer units and α-olefin monomer units having 4 to 10 carbon atoms, for example consisting of at least 80 wt % of propylene monomer units and at most 20 wt % of the comonomer units, at least 90 wt % of propylene monomer units and at most 10 wt % of the comonomer units or at least 95 wt % of propylene monomer units and at most 5 wt % of the comonomer units, based on the total weight of the propylene-based matrix.

Preferably, the comonomer in the propylene copolymer of the propylene-based matrix is selected from the group of ethylene, 1-butene, 1-pentene, 4-methyl-1-pentene, 1-hexen, 1-heptene and 1-octene, and is preferably ethylene.

Preferably, the propylene-based matrix consists of a propylene homopolymer.

The propylene-based matrix may e.g. be present in an amount of 50 to 95 wt %. Preferably, the propylene-based matrix is present in an amount of 60 to 85 wt %, for example at least 65 wt % or at least 70 wt % and/or at most 78 wt %, based on the total heterophasic propylene copolymer.

The propylene-based matrix is preferably semi-crystalline, that is it is not 100% amorphous, nor is it 100% crystalline. For example, the propylene-based matrix is at least 40% crystalline, for example at least 50%, for example at least 60% crystalline and/or for example at most 80% crystalline, for example at most 70% crystalline. For example, the propylene-based matrix has a crystallinity of 60 to 70%. For purpose of the invention, the degree of crystallinity of the propylene-based matrix is measured using differential scanning calorimetry (DSC) according to ISO11357-1 and ISO11357-3 of 1997, using a scan rate of 10° C./min, a sample of 5 mg and the second heating curve using as a theoretical standard for a 100% crystalline material 207.1 J/g.

Besides the propylene-based matrix, the heterophasic propylene copolymer also comprises a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The particle size of the dispersed phase is typically in the range of 0.05 to 2.0 microns, as may be determined by transmission electron microscopy (TEM). The amount of the dispersed ethylene-α-olefin copolymer in the heterophasic propylene copolymer may herein be sometimes referred as RC.

The amount of ethylene monomer units in the ethylene-α-olefin copolymer may e.g. be 20 to 65 wt %. The amount of ethylene monomer units in the dispersed ethylene-α-olefin copolymer in the heterophasic propylene copolymer may herein be sometimes referred as RCC2.

The α-olefin in the ethylene-α-olefin copolymer is preferably chosen from the group of α-olefins having 3 to 8 carbon atoms. Examples of suitable α-olefins having 3 to 8 carbon atoms include but are not limited to propylene, 1-butene, 1-pentene, 4-methyl-1-pentene, 1-hexen, 1-heptene and 1-octene. More preferably, the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer.

The dispersed ethylene-α-olefin copolymer is present in an amount of 50 to 5 wt %. Preferably, the dispersed ethylene-α-olefin copolymer is present in an amount of 40 to 15 wt %, for example in an amount of at least 22 wt % and/or for example in an amount of at most 35 wt % or at most 30 wt % based on the total heterophasic propylene copolymer.

In the heterophasic propylene copolymer in the composition of the invention, the sum of the total weight of the propylene-based matrix and the total weight of the dispersed ethylene-α-olefin copolymer is 100 wt % of the heterophasic propylene copolymer.

The α-olefin in the ethylene-α-olefin copolymer is preferably chosen from the group of α-olefins having 3 to 8 carbon atoms and any mixtures thereof, preferably the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer. Examples of suitable α-olefins having 3 to 8 carbon atoms, which may be employed as ethylene comonomers to form the ethylene α-olefin copolymer include but are not limited to propylene, 1-butene, 1-pentene, 4-methyl-1-pentene, 1-hexen, 1-heptene and 1-octene.

The thermoplastic polymer composition (X) may further comprise an elastomer of ethylene and α-olefin comonomer having 4 to 8 carbon atoms. The elastomer of ethylene and α-olefin comonomer having 4 to 8 carbon atoms may for example have a density in the range from 0.850 to 0.915 $g/cm^3$. Such elastomers are sometimes also referred to as plastomers.

The α-olefin comonomer in the elastomer is preferably an acyclic monoolefin such as 1-butene, 1-pentene, 1-hexene, 1-octene, or 4-methylpentene.

Accordingly, the elastomer is preferably selected from the group consisting of ethylene-1-butene copolymer, ethylene-1-hexene copolymer, ethylene-1-octene copolymer and mixtures thereof, more preferably wherein the elastomer is selected from ethylene-1-octene copolymer. Most preferably, the elastomer is an ethylene-1-octene copolymer.

Preferably, the density of the elastomer is at least 0.865 $g/cm^3$ and/or at most 0.910 $g/cm^3$. For example, the density of the elastomer is at least 0.850, for example at least 0.865, for example at least 0.88, for example at least 0.90 and/or for example at most 0.915, for example at most 0.910, for example at most 0.907, for example at most 0.906 $g/cm^3$. More preferable the density of the elastomer is in the range from 0.88 up to an including 0.907 $g/cm^3$, most preferably, the density of the elastomer is in the range from 0.90 up to and including 0.906 $g/cm^3$.

Elastomers which are suitable for use in the current invention are commercially available for example under the trademark EXACT™ available from Exxon Chemical Company of Houston, Texas or under the trademark ENGAGE™ polymers, a line of metallocene catalyzed plastomers available from Dow Chemical Company of Midland, Michigan or under the trademark TAFMER™ available from MITSUI Chemicals Group of Minato Tokyo or under the trademark Nexlene™ from SK Chemicals.

The elastomers may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. The elastomer s may also be prepared using traditional types of heterogeneous multi-sited Ziegler-Natta catalysts.

Preferably, the elastomer has a melt flow index of 0.1 to 40 dg/min (ISO1133, 2.16 kg, 190° C.), for example at least 1 dg/min and/or at most 35 dg/min. More preferably, the elastomer has a melt flow index of at least 1.5 dg/min, for example of at least 2 dg/min, for example of at least 2.5 dg/min, for example at least 3 dg/min, more preferably at least 5 dg/min and/or preferably at most 30 dg/min, more preferably at most 20 dg/min, more preferably at most 10 dg/min measured in accordance with ISO 1133 using a 2.16 kg weight and at a temperature of 190° C.

Preferably, the amount of ethylene incorporated into the elastomer is at least 50 mol %. More preferably, the amount of ethylene incorporated into the elastomer is at least 57 mol %, for example at least 60 mol %, at least 65 mol % or at least 70 mol %. Even more preferably, the amount of ethylene incorporated into the elastomer is at least 75 mol %. The amount of ethylene incorporated into the elastomer may typically be at most 97.5 mol %, for example at most 95 mol % or at most 90 mol %.

In a preferred embodiment, the thermoplastic polymer composition (X) comprises a thermoplastic polymer, wherein the thermoplastic polymer is a propylene homopolymer having an MFI in the range of 78 to 180 dg/min, preferably in the range from 78 to 148 dg/min, preferably in the range from 95 to 122 dg/min, more preferably in the range from 96 to 119 dg/min, even more preferably in the range from 103 to 118 dg/min as measured according to ISO1133-1:2011 with a 2.16 kg load at 230° C.

Other Additives in Thermoplastic Polymer Composition (X)

The thermoplastic polymer composition (X) may contain other usual additives, for instance nucleating agents and clarifiers, stabilizers, release agents, fillers, peroxides, plasticizers, anti-oxidants, lubricants, antistatics, cross linking agents, scratch resistance agents, high performance fillers, impact modifiers, blowing agents, acid scavengers, recycling additives, coupling agents, anti-microbials, anti-fogging additives, slip additives, anti-blocking additives, polymer processing aids, flame retardants and the like. Such additives are well known in the art. The skilled person will know how to choose the type and amount of additives such that they do not detrimentally influence the aimed properties Preferably, the amount of the thermoplastic polymer composition (X) is 25 to 75 wt %, for example 25 to 45 wt %, 45 to 60 wt % or 60 to 75 wt %, with respect to the total amount of the glass fiber reinforced polymer composition (G).

Glass Multifilament Strand

Glass fibres are generally supplied as a plurality of continuous, very long filaments, and can be in the form of strands, rovings or yarns. A filament is an individual fibre of reinforcing material. A strand is a plurality of bundled filaments. Yarns are collections of strands, for example strands twisted together. A roving refers to a collection of strands wound into a package.

For purpose of the invention, a glass multifilament strand is defined as a plurality of bundled glass filaments.

Glass multifilament strands and their preparation are known in the art.

The filament density of the continuous glass multifilament strand may vary within wide limits. For example, the continuous glass multifilament strand may have at least 500, for example at least 1000 glass filaments/strand and/or at most 10000, for example at most 5000 grams per 1000 meter. Preferably, the amount of glass filaments/strands is in the range from 500 to 10000 grams per 1000 meterglass filaments/strand.

The thickness of the glass filaments is preferably in the range from 5 to 50 μm, more preferably from 10 to 30 μm, even more preferably from 15 to 25 μm. Usually the glass filaments are circular in cross section meaning the thickness as defined above would mean diameter. The glass filaments are generally circular in cross section.

The length of the glass filaments is in principle not limited as it is substantially equal to the length of the sheathed continuous multifilament strand. For practical reasons of being able to handle the strand however, it may be necessary to cut the sheathed continuous multifilament strand into a shorter strand. For example the length of the sheathed continuous multifilament strand is at least 1 m, for example at least 10 m, for example at least 50 m, for example at least 100 m, for example at least 250 m, for example at least 500 m and/or for example at most 25 km, for example at most 10 km.

Preferably, the continuous glass multifilament strand comprises at most 2 wt %, preferably in the range from 0.10 to 1 wt % of a sizing based on the continuous glass multifilament strand. The amount of sizing can be determined using ISO 1887:2014.

A sizing composition is typically applied to the glass filaments before the glass filaments are bundled into a continuous glass multifilament strand.

Suitable examples of sizing compositions include solvent-based compositions, such as an organic material dissolved in aqueous solutions or dispersed in water and melt- or radiation cure-based compositions. Preferably, the sizing composition is an aqueous sizing composition.

As described in the art, e.g. in documents EP1460166A1, EP0206189A1 or U.S. Pat. No. 4,338,233, the aqueous sizing composition may include film formers, coupling agents and other additional components.

The film formers are generally present in effective amount to protect fibres from interfilament abrasion and to provide integrity and processability for fibre strands after they are dried. Suitable film formers are miscible with the polymer to be reinforced. For example; for reinforcing polypropylenes, suitable film formers generally comprise polyolefin waxes.

The coupling agents are generally used to improve the adhesion between the matrix thermoplastic polymer and the fibre reinforcements. Suitable examples of coupling agents known in the art as being used for the glass fibres include organofunctional silanes. More particularly, the coupling agent which has been added to the sizing composition is an aminosilane, such as aminomethyl-trimethoxysilane, N-(beta-aminoethyl)-gamma-aminopropyl-trimethoxysilane, gamma-aminopropyl-trimethoxysilane gamma-methylaminopropyl-trimethoxysilane, delta-aminobutyl-triethoxysilane, 1,4-aminophenyl-trimethoxysilane. Preferably, the sizing composition contains an aminosilane to enable a good adhesion to the thermoplastic matrix. The sizing composition may further comprise any other additional components known to the person skilled in the art to be suitable for sizing compositions. Suitable examples include but are not limited to lubricants (used to prevent damage to the strands by abrasion) antistatic agents, crosslinking agents, plasticizers, surfactants, nucleation agents, antioxidants, pigments as well as mixtures thereof.

Typically, after applying the sizing composition to the glass filaments, the filaments are bundled into the continuous glass multifilament strands and then wound onto bobbins to form a package.

Preferably, the amount of glass multifilament strand is 20 to 70 wt %, for example 20 to 35 wt %, 35 to 50 wt % or 50 to 70 wt %, with respect to the glass fiber reinforced polymer composition (G). Since a higher concentration of the glass filaments generally results in more white spots, the effect of the present invention may be more pronounced when the concentration of the glass filaments is higher.

Coupling Agent

The impregnated continuous multifilament strand may comprise a coupling agent as part of the sizing agent as described above. Alternatively, the thermoplastic polymer composition (X) may comprise a coupling agent.

The coupling agent may be a functionalized polyolefin grafted with an acid or acid anhydride functional group. The polyolefin is preferably polyethylene or polypropylene, more preferably polypropylene. The polypropylene may be a propylene homopolymer or a propylene copolymer. The propylene copolymer may be a propylene-α-olefin copolymer consisting of at least 70 wt % of propylene and up to 30 wt % of α-olefin, for example ethylene, for example consisting of at least 80 wt % of propylene and up to 20 wt % of α-olefin, for example consisting of at least 90 wt % of propylene and up to 10 wt % of α-olefin, based on the total weight of the propylene-based matrix. Preferably, the α-olefin in the propylene-α-olefin copolymer is selected from the group of α-olefins having 2 or 4-10 carbon atoms and is preferably ethylene. Examples of the acid or acid anhydride functional groups include (meth)acrylic acid and maleic anhydride. A particularly suitable material is for example maleic acid functionalized propylene homopolymer (for example Exxelor PO 1020 supplied by Exxon).

The amount of the coupling agent may e.g. be 0.5 to 3.0 wt %, preferably 1.0 to 2.0 wt %, based on the total amount of the glass fiber reinforced polymer composition (G).

Impregnating Agent

The amount of the impregnating agent in step b) of the process according to the invention is preferably in an amount from 0.50 to 18.0 wt %, for example from 0.5 to 10.0 wt % or for example from 10.0 to 18.0 wt % based on the total weight of the glass fiber reinforced polymer composition (G).

The optimal amount of impregnating agent applied to the continuous glass multifilament strand depends on the polymer sheath, on the size (diameter) of the glass filaments forming the continuous glass strand, and on the type of sizing composition. Typically, the amount of impregnating agent applied to the continuous glass multifilament strand is for example at least 0.50 wt %, preferably at least 1.0 wt %, preferably at least 1.5 wt %, preferably at least 2 wt %, preferably at least 2.5 wt % and/or at most 10.0 wt %, preferably at most 9.0 wt %, more preferably at most 8.0 wt %, even more preferably at most 7.0 wt %, even more preferably at most 6.0 wt %, even more preferably at most 5.5 wt %, or for example at least 10.0 wt %, preferably at least 11 wt %, preferably at least 12 wt % and/or at most 18 wt %, preferably at most 16 wt %, preferably at most 14% based on the amount of sheathed continuous multifilament strand. Preferably, the amount of impregnating agent is in the range from 1.5 to 8 wt %, even more preferably in the range from 2.5 wt % to 6.0 wt % based on the sheathed continuous multifilament strand. A higher amount of impregnating agent increases the Impact Energy per unit of thickness (J/mm). However, for reasons of cost-effectiveness and low emissions (volatile organic compounds) and mechanical properties, the amount of impregnating agent should also not become too high.

For example, the ratio of impregnating agent to continuous glass multifilament strand is in the range from 1:4 to 1:30, preferably in the range from 1:5 to 1:20.

Preferably, the viscosity of the impregnating agent is in the range from 2.5 to 200 cSt at 160° C., more preferably at least 5.0 cSt, more preferably at least 7.0 cSt and/or at most 150.0 cSt, preferably at most 125.0 cSt, preferably at most 100.0 cSt at 160° C.

An impregnating agent having a viscosity higher than 100 cSt is difficult to apply to the continuous glass multifilament strand. Low viscosity is needed to facilitate good wetting performance of the fibres, but an impregnating agent having a viscosity lower than 2.5 cSt is difficult to handle, e.g., the amount to be applied is difficult to control; and the impregnating agent could become volatile. For purpose of the invention, unless otherwise stated, the viscosity of the impregnating agent is measured in accordance with ASTM D 3236-15 (standard test method for apparent viscosity of hot melt adhesives and coating materials, Brookfield viscometer Model RVDV 2, #27 spindle, 5 r/min) at 160° C.

Preferably, the melting point of (that is the lowest melting temperature in a melting temperature range) the impregnating agent is at least 20° C. below the melting point of the thermoplastic polymer composition. More preferably, the impregnating agent has a melting point of at least 25 or 30° C. below the melting point of the thermoplastic polymer composition. For instance, when the thermoplastic polymer composition has a melting point of about 160° C., the melting point of the impregnating agent may be at most about 140° C.

Suitable impregnating agents are compatible with the thermoplastic polymer to be reinforced, and may even be soluble in said polymer. The skilled man can select suitable combinations based on general knowledge, and may also find such combinations in the art.

Suitable examples of impregnating agents include low molar mass compounds, for example low molar mass oligomeric polyurethanes, polyesters such as unsaturated polyesters, polycaprolactones, polyethyleneterephthalate, poly(alpha-olefins), such as highly branched polyethylenes and polypropylenes, polyamides, such as nylons, and other hydrocarbon resins.

For reinforcing polypropylenes, the impregnating agent preferably comprises highly branched poly(alpha-olefins), such as highly branched polyethylenes, modified low molecular weight polypropylenes, mineral oils, such as, paraffin or silicon and any mixtures of these compounds.

The impregnating agent preferably comprises at least 20 wt %, more preferably at least 30 wt %, more preferably at least 50 wt %, for example at least 99.5 wt %, for example 100 wt % of a branched poly(alpha-olefin), most preferably a branched polyethylene. To allow the impregnating agent to reach a viscosity of from 2.5 to 200 cSt at 160° C., the branched poly(alpha-olefin) may be mixed with an oil, wherein the oil is chosen from the group consisting of of mineral oils, such as a paraffin oil or silicon oil; hydrocarbon oils; and any mixtures thereof.

Preferably, the impregnating agent is non-volatile, and/or substantially solvent-free. In the context of the present invention, non-volatile means that the impregnating agent has a boiling point or range higher than the temperatures at which the impregnating agent is applied to the continuous multifilament glass strand. In the context of present invention, "substantially solvent-free" means that impregnating agent contains less than 10 wt % of solvent, preferably less than 5 wt % of solvent based on the impregnating agent. In a preferred embodiment, the impregnating agent does not contain any organic solvent.

The impregnating agent may further be mixed with other additives known in the art. Suitable examples include lubricants; antistatic agents; UV stabilizers; plasticizers; surfactants; nucleation agents; antioxidants; pigments; dyes; and adhesion promoters, such as a modified polypropylene having maleated reactive groups; and any combinations thereof, provided the viscosity remains within the desired range. Any method known in the art may be used for applying the impregnating agent to the continuous glass multifilament strand. The application of the impregnating agent may be performed using a die. Other suitable methods for applying the impregnating agent to the continuous multifilament strands include applicators having belts, rollers, and hot melt applicators. Such methods are for example described in documents EP0921919B1, EP0994978B1, EP0397505B1, WO2014/053590A1 and references cited therein. The method used should enable application of a constant amount of impregnating agent to the continuous multifilament strand.

Preferably, the amount of the impregnated continuous multifilament strand obtained in step b) of the process according to the invention is 25 to 75 wt %, for example 25 to 40 wt %, 40 to 55 wt % or 55 to 75 wt %, with respect to the glass fiber reinforced thermoplastic polymer composition (G). Preferably, the total amount of the impregnated continuous multifilament strand and the polymer sheath is 100 wt % with respect to the sheathed continuous multifilament strand.

Glass Fiber Reinforced Thermoplastic Polymer Composition (G)

The invention a glass fiber reinforced thermoplastic polymer composition (G). The glass fiber reinforced thermoplastic polymer composition (G) can for example be prepared by the process according to the invention.

The glass fiber reinforced thermoplastic polymer composition (G) is a sheathed continuous multifilament strand comprising a core that extends in the longitudinal direction and a polymer sheath which intimately surrounds said core, wherein the core comprises an impregnated continuous multifilament strand comprising at least one continuous glass multifilament strand, wherein the at least one continuous glass multifilament strand is impregnated with an impregnating agent, wherein the polymer sheath consists of a thermoplastic polymer composition (X), wherein the MFI of the thermoplastic polymer composition (X) is in the range from 78 to 180 dg/min as measured according to ISO1133-1:2011 with a 2.16 kg load at 230° C.

The core of the sheathed continuous multifilament strand comprises an impregnated continuous multifilament strand, for example one or more impregnated continuous multifilament strands. The impregnated continuous multifilament strands can for example be prepared in step b) of the present invention. Preferably, the one or more impregnated continuous multifilament strands form at least 90 wt %, more preferably at least 93 wt %, even more preferably at least 95 wt %, even more preferably at least 97 wt %, even more preferably at least 98 wt %, for example at least 99 wt % of the core. In a preferred embodiment, each core consists of the one or more impregnated continuous multifilament strands.

In the context of the invention with 'extends in the longitudinal direction' is meant 'oriented in the direction of the long axis of the sheathed continuous multifilament strand'.

The term intimately surrounding as used herein is to be understood as meaning that the polymer sheath substantially entirely contacts the core. Said in another way the sheath is applied in such a manner onto the core that there is no deliberate gap between an inner surface of the sheath and the core containing the impregnated continuous mutifilament strands. A skilled person will nevertheless understand that a certain small gap between the polymer sheath and the glass filaments may be formed as a result of process variations. Preferably, therefore, the polymer sheath comprises less than 5 wt. % of said filament, preferably less than 2 wt. % of filament based on the total weight of the polymer sheath.

In one embodiment, the thermoplastic polymer composition (X) of the polymer sheath is the thermoplastic polymer composition (X) used in step c) of the process according to the invention.

In a preferred embodiment, the thermoplastic polymer composition (X) of the polymer sheath comprises a thermoplastic polymer, wherein the thermoplastic polymer is a propylene homopolymer having an MFI in the range of 78 to 180 dg/min, preferably in the range from 78 to 148 dg/min, preferably in the range from 95 to 122 dg/min, more preferably in the range from 96 to 119 dg/min, even more preferably in the range from 103 to 118 dg/min as measured according to ISO1133-1:2011 with a 2.16 kg load at 230° C.

Preferably the amount of the thermoplastic polymer is in the range from 65.1 to 99.5 wt %, preferably in the range from 85.3 to 99.2 wt %, even more preferably in the range from 93.2 to 99.0 wt % based on the total amount of the thermoplastic polymer composition (X).

In one embodiment, the impregnating agent in the sheathed continuous multifilament strand is the impregnating agent used in step b) of the process according to the invention.

In one embodiment, the at least one continuous glass multifilament strand in the sheathed continuous multifilament strand is the at least one continuous glass multifilament strand used in step a) of the process according to the invention.

The present invention further relates to the use of the glass fiber reinforced thermoplastic polymer composition (G) in automotive application.

The present invention further relates to an automotive part comprising a glass fiber reinforced thermoplastic polymer composition (G) wherein the amount of the glass fiber reinforced thermoplastic polymer composition (G) is at least 95 wt % based on the total weight of the automotive part.

The automotive part can for example be prepared by injection moulding the glass fiber reinforced thermoplastic polymer composition (G).

It is noted that the invention relates to the subject-matter defined in the independent claims alone or in combination with any possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

Experiment

Material

PP1: PP1 is PP 595A commercially available from SABIC. PP 595A is a propylene homopolymer. The MFI of PP 595A is 46 dg/min as measured according to ISO1133-1:2011 with a 2.16 kg load at 230° C.

PP2: PP2 is TI2600C commercially available from Braskem. TI2600C is a heterophasic propylene homopolymer. The MFI of TI2600C is 66 dg/min as measured according to ISO1133-1:2011 with a 2.16 kg load at 230° C.

PP3: PP3 is TI2900C commercially available from Braskem. TI2900C is propylene homopolymer. The MFI of TI2900C is 115 dg/min as measured according to ISO1133-1:2011 with a 2.16 kg load at 230° C.

Glass strand: TUFRov LFT9000 commercially available from PPG Fiber Glass was used. The glass filament in TUFRov LFT9000 has a diameter of 19 micron, the glass strand has a tex of 3000 (tex means grams glass per 1000 m).

Impregnating agent: a highly branched polyethylene wax having density: 890-960 kg/m3, dynamic viscosity: 40-58 mPa·s at 100° C. (ASTM D3236) (Dicera 13082 Paramelt)

Talc: HTPultra 5c is an untrafine talc commercially available from IMI FABIC. The mean particle size of talc (D50) of Talc HTPultra 5c is 0.65 μm as measured according to sedimentation analysis, Stockes' law (ISO 13317-3:2001).

Additive package: The additive package consist of 70 wt % Exxelor PO1020 from ExxonMobil as coupling agent, 10 wt % Sabostab UV 119 from SABO as UV stabilizer, 20 wt % Irganox® B 225 from BASF as stabilizer. The percentage is based on the total amount of the additive package.

Process

Glass fiber reinforced polymer composition were prepared using PP1, PP2, PP3, Glass strand, impregnating agent, additive package as given in Table 1 using the following process:

Unwinding the Glass Strand;

Applying the impregnating agent to the glass fiber strands to form an impregnated strand;

Applying a sheath of thermoplastic polymer around the impregnated strand in a sheathing step which was performed in-line directly after the impregnating step, using a 75 mm twin screw extruder (manufactured by Berstorff, screw UD ratio of 34), at a temperature of about 250° C., which fed the molten PP1 or PP2 or PP3 with additive package to an extruder-head wire-coating die. The line speed was 200 meters per min.

Then the sheathed strand was cooled in a water bath then cut into pellets of 15 mm length.

Specimen and Evaluation

The obtained pellets were injection moulded into plaques with dimensions 510*310*2 mm. The number of visible white spots on one side of a plaque was counted. In total 15 plaques were evaluated for each composition and an average white spot (WS) value is calculated as in Table 1.

Result

TABLE 1

Compositions of examples and white spot performance

|  | CE1 | CE2 | IE1 |
|---|---|---|---|
| PP1 (wt %) | 50 |  |  |
| PP2 (wt %) |  | 50 |  |
| PP3 (wt %) |  |  | 50 |
| Talc (wt %) | 3 | 3 | 3 |
| Glass strand (wt %) | 40 | 40 | 40 |
| Impregnating agent (wt %) | 4 | 4 | 4 |
| Additive package (wt %) | 3 | 3 | 3 |
| WS | 4.3 | 2.9 | 2.1 |

As shown in Table 1, only IE1 according to the invention has an improved white spot performance.

The invention claimed is:

1. Process for the preparation of a glass fiber reinforced polymer composition (G), comprising the subsequent steps of
    a) unwinding from a package of at least one continuous glass multifilament strand;
    b) applying an impregnating agent to the continuous glass multifilament strand to form an impregnated continuous multifilament strand; and
    c) applying a sheath of thermoplastic polymer composition (X) around the impregnated continuous glass multifilament strand to form a sheathed continuous multifilament strand, wherein the melt flow index (MFI) of the thermoplastic polymer composition (X) is in the range from 78 to 180 dg/min as measured according to ISO1133-1:2011 with a 2.16 kg load at 230° C.;
    wherein the process runs at a line speed of at least 100 m/min.

2. Process according to claim 1 wherein the thermoplastic polymer composition (X) comprises a thermoplastic polymer.

3. Process according to claim 2 wherein the thermoplastic polymer is a polypropylene.

4. Process according to claim 1 wherein the MFI of the thermoplastic polymer composition (X) is in the range from 78 to 148 dg/min.

5. Process according to claim 1 wherein the amount of the glass multifilament strand in the composition is from 20 to 70 wt %, based on the total weight of the glass fiber reinforced polymer composition.

6. Process according to claim 1, wherein the process further comprises the following subsequent steps after step c) to obtain the glass fiber reinforced polymer composition (G) in pellet form:
    d) cooling the sheathed continuous glass multifilament;
    e) cutting the sheathed continuous glass multifilament strand into pellets.

7. Process according to claim 6, wherein the cooling step d) is performed in water bath.

8. Process according to claim 6, wherein the pellet obtained in the cutting step e) has a length from 2 to 50 mm.

9. Process according to claim 1, further comprising:
    forming the glass fiber reinforced polymer composition into an automotive component by injection-moulding.

10. Process according to claim 2 wherein the thermoplastic polymer is a propylene homopolymer.

11. Process according to claim 1 wherein the MFI of the thermoplastic polymer composition (X) is in the range from 95 to 122 dg/min, or in the range from 96 to 119 dg/min, or in the range from 103 to 118 dg/min.

12. Process according to claim 1, wherein the amount of the glass multifilament strand in the composition is from 20 to 35 wt %, or 35 to 50 wt % or 50 to 70 wt %, based on the total weight of the glass fiber reinforced polymer composition.

13. Process according to claim 1,
    wherein the process runs at a line speed of at least 150 m/min.

14. Process according to claim 1, wherein the impregnating agent is in an amount from 0.50 to 18.0 wt %, based on the total weight of the glass fiber reinforced polymer composition (G).

15. Process for the preparation of a glass fiber reinforced polymer composition (G), comprising the subsequent steps of a) unwinding from a package of at least one continuous glass multifilament strand;

b) applying an impregnating agent to the continuous glass multifilament strand to form an impregnated continuous multifilament strand; and c) applying a sheath of thermoplastic polymer composition (X) around the impregnated continuous glass multifilament strand to form a sheathed continuous multifilament strand, wherein the melt flow index (MFI) of the thermoplastic polymer composition (X) is in the range from 78 to 180 dg/min as measured according to ISO1133-1:2011 with a 2.16 kg load at 230° C., wherein the process runs at a line speed of at least 100 m/min, wherein the process further comprises the following subsequent steps after step c) to obtain the glass fiber reinforced polymer composition (G) in pellet form;

d) cooling the sheathed continuous glass multifilament;

e) cutting the sheathed continuous glass multifilament strand into pellets, wherein a total amount of the thermoplastic polymer composition (X) and the impregnated continuous multifilament strand in a pellet obtained by the cutting step is at least 95 wt % with respect to the pellet.

16. Process for the preparation of a glass fiber reinforced polymer composition (G), comprising the subsequent steps of a) unwinding from a package of at least one continuous glass multifilament strand;

b) applying an impregnating agent to the continuous glass multifilament strand to form an impregnated continuous multifilament strand; and c) applying a sheath of thermoplastic polymer composition (X) around the impregnated continuous glass multifilament strand to form a sheathed continuous multifilament strand, wherein the melt flow index (MED of the thermoplastic polymer composition (X) is in the range from 78 to 180 de/min as measured according to ISO1133-1:2011 with a 2.16 kg load at 230° C., wherein the process runs at a line speed of at least 100 m/min, wherein the impregnating agent comprises a branched polyethylene wax having an apparent viscosity in the range from 2.5 to 200 cSt at 160° C. measured in accordance with ASTM D 3236-15.

\* \* \* \* \*